No. 823,752. PATENTED JUNE 19, 1906.
F. M. ASHLEY.
AUTOMATIC INKSTAND.
APPLICATION FILED OCT. 22, 1902.
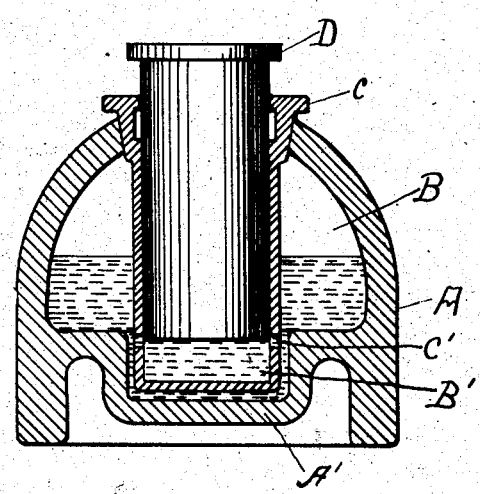
WITNESSES:
INVENTOR
Frank M. Ashley

UNITED STATES PATENT OFFICE.

FRANK M. ASHLEY, OF NEW YORK, N. Y.

AUTOMATIC INKSTAND.

No. 823,752.  Specification of Letters Patent.  Patented June 19, 1906.

Application filed October 22, 1902. Serial No. 128,265.

*To all whom it may concern:*

Be it known that I, FRANK M. ASHLEY, a citizen of the United States, and a resident of New York city, in the county and State of New York, have invented certain new and useful Improvements in Automatic Inkstands, of which the following is a specification.

The present invention relates to that class of inkstands wherein ink is forced from a well, usually a closed chamber, upon the depression of a float by the pen of a user.

The more prominent object of the present invention is the production of a simple and efficient construction of inkstand of the type mentioned wherein the depression of the float will successively effect the practical trapping or isolation of a body of ink from the main ink-supply and the forcing of a quantity of said trapped or isolated body of ink upward within the float for access by the pen.

The novel construction also provides for adequately maintaining the ink so that the same can be positively acted on and forced upward upon each depression of the float and the utilization of all the ink in the well insured.

In the accompanying drawing, forming part of this specification, the figure is a vertical sectional view of an inkstand embodying my invention, the float being shown in elevation.

A is the reservoir having an upper centrally-located opening and a central depression A' in its bottom. C is a sleeve which is supported in said upper opening and depends within the reservoir A and is provided with lateral holes C' near its lower end. The lower end of this sleeve is closed and occupies the depression A' and constitutes a supplemental reservoir B', which extends from the holes C' to its lower end.

B designates the primary ink-compartment of the reservoir A.

The depression A' is not necessary to the operation of the stand in so far as the principle of its operation is concerned; but by its use the supplemental reservoir may be located below the main body of ink, and thus allow practically all of the ink to flow thereto, so that it may be raised by the float for use, and therefore from a commercial standpoint is absolutely necessary, as otherwise a considerable portion of the ink within the main reservoir could not be raised by the float for use.

D is a float of hard rubber and of a form well known in the art. This float is vertically movable within the sleeve and is shown as being of a length that with the upper end of the float extended somewhat above the corresponding end of the sleeve the lower extremity of said float can occupy a position above the lateral holes C'.

Ink within the primary compartment B will by reason of the reduced pressure area jointly presented by the restricted holes C' as compared with the pressure area of the vertical passage afforded by the float establish a supply of ink within the supplemental reservoir B', the level of which will be above the said holes C'. Now upon the depression of the float the ink within the supplemental reservoir will be practically trapped or isolated from the main supply within the primary compartment, and a quantity of said trapped or isolated ink will be forced up to a point within the float, where said ink will be accessible by the pen. Upon the subsequent rising of the float the feed of ink from the main supply to the supplemental reservoir will be resumed until the float is again buoyantly supported in a plane above the holes C'. When, however, the amount of ink removed from the stand results in such diminution of the volume of air within the upper part of the compartment B as will interfere with the automatic reëstablishment of the working level for the float, the mere momentary and limited lifting of the float by hand will result in air descending in the central passage thereof and flow through the holes C' to work or bubble up through the ink in the primary compartment and augment the volume of air in the latter. In the event of the sleeve being so loosely fitted within the top opening of the reservoir A that air can enter at such point within the compartment B the manipulation of the float, as previously described, will not be necessary, as any tendency to rarefaction with the compartment B will thus be overcome.

It will be appreciated that the depression of the float insures such trapping or practical isolation of the quantity of ink within the supplemental reservoir as will serve to nicely gage the amount of ink forced upward, and hence the liability of objectionable spurting or overflow is avoided. Moreover, the location of the supplemental reservoir below the plane of the interior surface of the well-bottom insures the ultimate forcing upward of practically all the ink within the stand.

The construction is extremely simple and inexpensive and can be maintained and used in a cleanly manner. It will also be noted that the sleeve and float can be easily conjointly removed when desired.

The float may be of less length than the sleeve, the only requirement being that it be capable of being depressed below the lower end of the sleeve proper. Furthermore, the float need not closely conform within the sleeve, for if the holes C' are sufficiently restricted in size the practical trapping or isolation of the ink will still ensue upon the depression of the float.

Having now described my invention, what I claim as new, and desire to secure by Letters Patent, is—

1. In an inkstand of the character described, a main reservoir containing a primary ink-compartment and lower depression below the bottom surface of said compartment, a sleeve within said compartment and having a closed lower end extending within said depression, said sleeve containing lateral holes establishing communication with the primary compartment, and below which holes the sleeve constitutes a supplementary reservoir, and a pen-float vertically movable within said sleeve and adapted to be depressed to cover said holes for successively isolating a quantity of ink within the reservoir and for forcing said ink upward within the float.

2. In an inkstand of the character described, a main reservoir, a sleeve closed at its lower extremity and provided with lateral holes a short distance above its lower end which establish communication with the main reservoir, the sleeve below said holes constituting a supplementary reservoir, a pen-float vertically movable within said sleeve and supplementary reservoir adapted to force ink to the top of said float.

3. In an inkstand of the character described, a main reservoir, a sleeve closed at its lower extremity and provided with lateral holes establishing communication with the main reservoir, the sleeve below said holes constituting a supplementary reservoir, a pen-float vertically movable within said sleeve and adapted to be depressed below said holes and thereby force a quantity of ink upward to the top of the float.

4. In an inkstand of the character described, a main reservoir, a sleeve closed at its lower extremity and provided with lateral holes establishing communication with the main reservoir, the sleeve below said holes constituting a supplementary reservoir, a pen-float vertically movable within said sleeve and adapted to be depressed below said holes and thereby force a quantity of ink upward to the top of the float, said lateral holes in the sleeve being located below the plane of the bottom of the main reservoir for the purpose set forth.

5. In an inkstand of the character described, a main reservoir containing a primary ink-compartment and a lower depression below the bottom surface of said compartment, a sleeve extending through the main reservoir into the said lower depression, provided with an opening adapted to admit ink within said sleeve from the reservoir, and a float vertically movable within said sleeve adapted to force ink within said sleeve to the upper end of the float.

6. In an inkstand of the character described, a main reservoir containing a primary ink-compartment and a lower depression below the bottom surface of said compartment, a sleeve extending within said lower depression provided with an opening adapted to admit ink within said sleeve from the reservoir, and a float vertically movable within said sleeve adapted to trap and upwardly force a quantity of ink to the upper end of said float.

Signed at New York, in the county of New York and State of New York, this 21st day of October, A. D. 1902.

FRANK M. ASHLEY.

Witnesses:
 PHILIP K. STERN,
 HELEN E. MAHER.